United States Patent [19]
Davis

[11] Patent Number: 5,481,266
[45] Date of Patent: Jan. 2, 1996

[54] AUTODYNE MOTION SENSOR

[76] Inventor: Warren F. Davis, 43 Holden Rd., West Newton, Mass. 02165

[21] Appl. No.: 341,009

[22] Filed: Nov. 17, 1994

[51] Int. Cl.$^6$ .............................. G01S 13/56; G01S 13/62
[52] U.S. Cl. ............................................................... 342/28
[58] Field of Search ........................................ 342/28, 29

[56] References Cited

U.S. PATENT DOCUMENTS

| | | | |
|---|---|---|---|
| 3,803,599 | 4/1974 | McLean et al. | 343/5 PD |
| 3,832,709 | 8/1974 | Klein et al. | 343/5 PD |
| 3,896,435 | 7/1975 | Constant | 342/28 |
| 3,925,774 | 12/1975 | Amlung | 340/258 A |
| 3,947,834 | 3/1976 | Gershberg et al. | 340/554 |
| 4,107,684 | 8/1978 | Watson, Jr. | 340/552 X |
| 4,117,464 | 9/1978 | Lutz | 340/554 |
| 4,286,260 | 8/1981 | Gershberg et al. | 340/554 |
| 4,287,511 | 9/1981 | Scott et al. | 340/541 |
| 4,398,184 | 8/1983 | Scott et al. | 340/531 |
| 4,563,625 | 1/1986 | Kornbrekke et al. | 318/603 |
| 4,736,097 | 4/1988 | Philipp | 250/221 |
| 4,879,461 | 11/1989 | Philipp | 250/221 |
| 4,967,083 | 10/1990 | Kornbrekke et al. | 250/341 |
| 5,043,703 | 8/1991 | Dipoala et al. | 340/554 |
| 5,093,656 | 3/1992 | Dipoala | 340/522 |
| 5,136,298 | 8/1992 | Williams | 342/112 |
| 5,150,099 | 9/1992 | Lienau | 340/552 |
| 5,170,162 | 12/1992 | Fredericks | 340/935 |
| 5,194,847 | 3/1993 | Taylor et al. | 340/557 |
| 5,196,826 | 3/1993 | Whiting | 340/554 |
| 5,220,922 | 6/1993 | Barany | 128/660.01 |
| 5,262,783 | 11/1993 | Philpott et al. | 342/28 |
| 5,317,304 | 5/1994 | Choi | 340/571 |
| 5,331,308 | 7/1994 | Buccola et al. | 340/522 |

OTHER PUBLICATIONS

Jacob Fraden, *AIP Handbook of Modern Sensors*, 1993, § 6.2, pp. 314–318.

Primary Examiner—John B. Sotomayor

[57] ABSTRACT

An autodyne motion sensor apparatus and method intended for use with automatic doors comprising, in a preferred embodiment, a phase coherent transceiver (11) incorporating dual demodulators in phase quadrature, means for amplification of the demodulated signals (12 and 13), means for converting the amplified demodulated signals to digital form (14 and 15) for input to a microprocessor, a microprocessor (16), provision for externally generated microprocessor interrupts corresponding to the instantaneous position of the door (17), provision for a uniform series of timing interrupts (18) to be applied to the microprocessor, provision for other microprocessor inputs a) characterizing the position and sense of motion of the door and b) parameter values utilized by the motion detection algorithm executed by the microprocessor, and a microprocessor detection signal output used to actuate the controlled door. The post-demodulation functionality of the sensor is determined essentially entirely by a stored program executed by the microprocessor. The signature of the door is recorded by the program when the sensor is powered up or when recalibration is otherwise initiated. Thereafter, the program subtracts the recorded signature of the door from the digital representation of the raw sensor input, thereby rendering the sensor selectively insensitive to the motion of the door while it remains fully capable of detecting the motion of other objects within the field of the sensor.

10 Claims, 4 Drawing Sheets

AUTODYNE MOTION SENSOR

FIELD OF THE INVENTION

This invention relates to motion detecting apparatus and methods, and, more particularly, relates to motion detecting apparatus and methods for automatic doors.

BACKGROUND OF THE INVENTION

Conventional autodyne motion sensors used to actuate automatic doors generate a phase coherent beam, typically of X or K-band microwaves, that is reflected from moving objects within the field of the sensor back into the sensor. The received microwave reflections are electronically compared within the sensor with the outgoing microwave signal (autodyne process) to create a difference Doppler signal proportional to the amplitude and relative phase of the reflected microwaves. The frequency of this Doppler signal (Doppler shift), which is typically in the low audio range, is proportional to the component of the motion of the reflecting object toward or away from the source of the microwaves within the sensor (longitudinal motion). The Doppler signal is processed by a variety of means into a binary motion detection signal that is used to actuate the automatic door.

Motion sensors of this design suffer from a number of significant shortcomings. First, they respond poorly, or not at all, to objects moving at right angles to the line of position between the beam source within the sensor and the reflecting object (transverse motion). This is because instantaneously the relative distance between the sensor and the object does not change for this type of motion. Under this circumstance the frequency of the Doppler signal drops to zero and, in conventional designs, is undetectable. Consequently, to be effective and reliable, motion sensors of this type must be positioned so that the direction of the anticipated motion to be detected is not purely transverse but contains a substantial longitudinal component.

Second, motion sensors of this design are not able to discriminate between the motion of the door they actuate and pedestrians and other objects passing through the door. Consequently, they must be deployed with their beams aimed generally away from the door so that they respond only to pedestrians and objects approaching the door but not to the door itself. Otherwise, the motion of the door will trigger the sensor, resulting in endless cycling of the door. This consideration limits possible sensor mounting positions to areas immediately adjacent to the door, such as on the door header or jambs. To minimize contact, access or interference with pedestrians or objects passing through the door, this type of motion sensor is invariably mounted on the door header facing generally toward the approaching traffic.

As a result of the foregoing, motion sensors of this design must be positioned more-or-less directly above a pedestrian or object about to enter the area swept by the door. Because the motion of pedestrians and objects passing through the door is substantially horizontal and, consequently, transverse to the motion sensor on the door header, the Doppler shift, upon which the sensor depends to generate a motion detection signal, is minimal or zero in the region just in front of the door opening. Furthermore, in order to prevent triggering of the sensor by the motion of the door itself, the motion sensor must be aimed so that the proximal operational edge of its detection beam or pattern lies just in front of the door opening, coincident with the area of reduced detection capability due to minimal or zero Doppler shift. The edge of the detection beam is defined as the locus of points outside of which the detection capability of the sensor drops to zero due to the fall off of the beam intensity, independent of the Doppler shift. Consequently, motion sensors of this design exhibit severely compromised detection capability immediately in front of the area swept by the door due to the unfortunate coincidence of the minimal Doppler shift and beam edge effects in that region.

In many door designs, other sensors that might prevent door motion when an object or person is present must be disabled for part of the door cycle, leaving the area swept by the door unprotected. Such designs depend upon the motion sensor, which is not disabled, to detect residual motion of pedestrians or objects into the unprotected door opening. Because of the compromised detection capability of motion sensors of the type considered immediately in front of the door opening as explained above, motion detection may fail, with the result that a person or object may enter the sweep of the door and be struck.

A further disadvantage of motion sensors of conventional design is that, because they must be aimed generally away from the door that they control, they provide incomplete coverage in the area immediately in front of the door opening. In particular, they provide poor coverage in the vicinity of the door jambs. This is because the area within which they detect is bounded by a roughly elliptical perimeter. Consequently, the detection area, which closely approaches the door opening on the centerline through the doorway, necessarily curves away from the plane of the door opening in either direction to the side away from the centerline. In contrast, the older control mat technology, which beam sensors have largely replaced, provides uniform coverage all the way across the door opening, right up to the door jambs.

A further shortcoming of current autodyne motion sensor designs is that they do not take full advantage of the phase information that can be extracted from the energy reflected back into the sensor. Many designs contain only one demodulator, so that, in any case, only half of the phase information is available. [The term "demodulator" is used throughout this document in place of the customary "detector" to differentiate between the electronic detector component, or components, within the sensor and the overall function of the sensor itself as a detector of motion.] Designs that do contain two demodulators use the available phase information only to determine whether the detected object is moving toward or away from the sensor. The individual signals from the demodulators, whether one or two, are oscillatory. To minimize false triggering, the motion detection signal in conventional designs is generated only when a certain number of cycles of this oscillatory behavior occur within a prescribed interval of time. As a result, there is an inherent time delay between the onset of oscillatory behavior and generation of the motion detection signal. On the other hand, the delay can be reduced considerably, without incurring a higher frequency of false detections or sacrificing the ability to discriminate motion toward or away from the sensor, by properly combining the signals from two demodulators.

It would be desirable if motion sensors of the autodyne type could be mounted in locations other than on the door header, thereby removing the region of minimum Doppler shift from the area immediately in front of the door opening. However, this would necessarily require that the motion sensor beam be directed generally toward, rather than away from, the door opening with the result that, with current designs, the door would be endlessly cyclically actuated. Thus, it would also be desirable if the motion sensor could be designed selectively to ignore the signature of the door itself while remaining fully capable of responding to the motion of objects other than the door. A sensor so designed could then be deployed with its beam facing generally toward the door, removing both the beam edge and the region of minimal Doppler shift from the area immediately in front of the door opening. Furthermore, as a consequence of being aimed toward the door, the detection area of such a motion sensor could extend all the way to the door jambs, unlike current designs. It would also be desirable for the motion sensor to be designed to combine the phase information available from two demodulators in quadrature to minimize the delay in generating the motion detection signal without increasing the frequency of false motion detection.

SUMMARY OF THE INVENTION

This invention is a method and apparatus for autodyne motion detection that enables the motion sensor to be located so that the region of minimal Doppler shift is displaced from the area immediately in front of the door opening. Furthermore, the motion sensor beam can be directed so as to include the door itself without inducing endless door cycling, thereby enabling the beam edge also to be displaced from the area immediately in front of the door opening.

In a preferred embodiment, the invention includes a source of phase coherent radiation, such as X or K-band microwaves generated by a Gunn diode oscillator and projected into the environment in which motion detection is required using an antenna such as a microwave horn or microstrip patch radiator. Two autodyne demodulators, which, for microwaves, would typically consist of Schottky diodes, are arranged to produce the quadrature components of the Doppler signals that result from reflections of the radiation from objects moving within the detection environment. The Doppler signals are amplified and converted to digital form for processing into a detection signal by an included microprocessor in a manner described in detail below.

The microprocessor requires additional input signals characterizing the position and state of motion of the door being controlled. In particular, a signal indicating whether the door is opening, closing or stopped; and signals indicating if the door is fully opened or fully closed. All of the required detection functionality is realized using program logic contained within the microprocessor that utilizes the interrupt handling structure of the microprocessor. Thus, in a preferred embodiment, additional clock, door position and calibration interrupts are provided to the microprocessor.

In a preferred embodiment, the microprocessor and its associated memory are used to record automatically the unique Doppler signature of the door itself and to subtract that signature from routine raw operational Doppler signals. The sensor motion detection signal used to actuate the door is generated from the raw Doppler signal after subtraction of the door signature. Consequently, when the only motion within the sensor beam is that of the door itself, the result is zero to within instrumental errors, which are, by design, minimal and the motion of the door is not detected. This enables the door to close successfully in the absence of objects or pedestrians.

When objects or pedestrians are present within the motion sensor beam, the door signature is likewise subtracted from the raw Doppler signal, leaving a signal that may be described as characteristic of the objects or pedestrians in the absence of the door motion. The precise nature of the resulting signal depends upon the degree to which the person or object (the target) shields or obscures the door motion, and its contribution, from the perspective of the location of the motion sensor. If the target does not at all obscure the door, the resultant signal represents the motion of only the target because the door signature was fully present in the raw Doppler signal before subtraction. On the other hand, if the target partially or completely obscures the door from the perspective of the sensor, the resultant signal is over compensated for the door motion because the door signature was not fully present in the raw Doppler signal. The signal component due to the relative motion of the target is nevertheless present.

The phenomenon of over compensation for the door when the door is partially or fully obscured from the perspective of the motion sensor has an intended consequence that can be most easily appreciated by considering the case when the target is stationary. In this case, the target, being stationary, generates no Doppler shift and would therefore be undetectable by current motion sensors of the autodyne type. However, since the motion sensor detection signal is generated from the raw Doppler signal after subtraction of the door signature, there is a net signal when the target is stationary and the door is obscured, which is simply the negative of the door signature itself. Assuming that the unobscured door signature is sufficiently strong, the result is that the disclosed sensor will trigger when the target is motionless and obscuring the door. An equivalent sequence obtains if the target is in purely transverse motion and obscuring the door. Generally, the disclosed motion sensor exhibits characteristics of a presence sensor in proportion to the extent that the motion of the door is obscured by the target. Since the sensor is intended to be located some distance away from the door and aimed generally toward it, the door will be more effectively obscured as the target approaches the door. Thus, the disclosed sensor provides an additional margin of safety by exhibiting presence detection capability as the target approaches the door.

It is an object of this invention to provide a new and improved autodyne motion detection apparatus and method.

It is another object of this invention to provide a new and improved autodyne motion detection apparatus and method that allows the motion sensor to be positioned and aimed so that the region of minimum Doppler shift and the edge of the detection pattern are displaced away from the critical area immediately in front of the door opening.

It is yet another object of this invention to provide a new and improved autodyne motion detection apparatus and method that allows the motion sensor to be selectively insensitive to the motion of the controlled door while remaining responsive to other moving objects and pedestrians within its detection area.

It is a further object of this invention to provide a new and improved autodyne motion detection apparatus and method wherein the motion sensor automatically and/or on manual initiation records the Doppler signature characteristic of the motion of the controlled door for subsequent use by the detection signal generation algorithm.

It is a further object of this invention to provide a new and improved autodyne motion detection apparatus and method that allows the motion sensor to be aimed so that the sensor beam includes the controlled door without causing door actuation to cycle endlessly and that allows the critical area immediately in front of the door opening to be illuminated by the strong central portion of the sensor beam for enhanced detection capability and reliability rather than by the beam edge at which detection capability and reliability drop to zero.

It is another object of this invention to provide a new and improved autodyne motion detection apparatus and method that allows the motion sensor to be positioned and aimed so that the region within which detection takes places covers the entire door opening, including the areas next to the jambs.

It is a further object of this invention to provide a new and improved autodyne motion detection apparatus and method that allows the motion sensor to exhibit presence sensor characteristics in the critical area immediately in front of the door opening for greater safety and reliability of detection.

It is a further object of this invention to provide a new and improved autodyne motion detection apparatus and method that implements the bulk of the detection signal generation logic and functionality with a stored program executed by a microprocessor provided for the purpose.

It is a further object of this invention to provide a new and improved autodyne motion detection apparatus and method wherein the stored program within the microprocessor used to implement the detection signal logic and other functionality utilizes the interrupt handling capabilities of the microprocessor.

It is a further object of this invention to provide a new and improved autodyne motion detection apparatus and method that combines the signals available from two demodulators in quadrature to decrease motion detection delay relative to current designs without increasing the frequency of false detections.

Other objectives and advantages will become apparent to one skilled in the art as the description proceeds, as will certain discretionary and circumstantial implementation variations, some, but not all, of which are explicitly mentioned. It is to be understood that any such changes or variations in the precise embodiment of the herein disclosed invention are meant to be included as coming within the scope of this invention.

Figure 1:
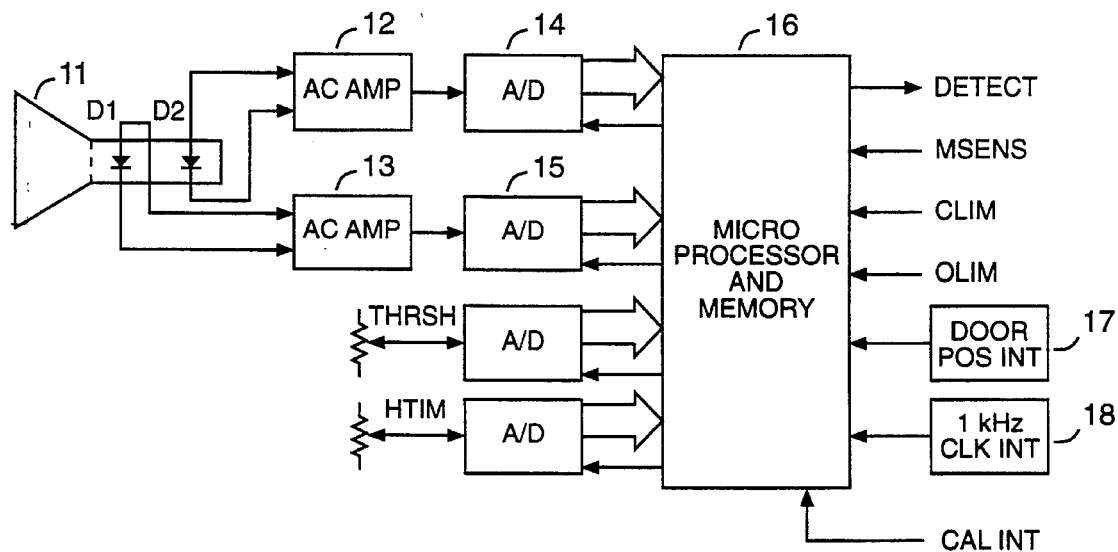
FIG. 1. is a schematic diagram illustrating the overall functional organization of the present invention.

| REFERENCE NUMERALS IN FIGURES | |
| --- | --- |
| 11 Coherent radiation transceiver | 12 AC coupled amplifier |
| 13 AC coupled amplifier | 14 Analog-to-digital converter |
| 15 Analog-to-digital converter | |
| 17 Door position interrupts | 16 Microprocessor and associated memory |
| | 18 Uniform time interrupts |

DETAILED DESCRIPTION OF THE INVENTION

Content of FIG. 1

With reference to FIG. 1, 11 represents a source of phase coherent electromagnetic or other radiation, typically, but not restricted to, X or K-band microwaves, that is formed into a beam defining the volume of space within which the motion sensor is capable of responding. The actual source of the radiation, typically a Gunn diode in the case of microwaves, is not illustrated within 11.

Demodulators D1 and D2 within 11 represent autodyne demodulators of the component of the radiation emanating from 11 that is returned to 11 by reflections from objects within the sensor beam. For microwave radiation, D1 and D2 would typically be Schottky mixer diodes. However, D1 and D2 are to be understood to be generic symbols standing for any suitable demodulator technology. Obvious details, such as RF decoupling and bias supply, if any, are not shown. The essential requirement imposed upon D1 and D2 is that reflections from distinct objects within the sensor beam must produce demodulated signals within D1 and D2 that are linearly independent. That is, the signal produced in either D1 or D2 is, to the degree of approximation required by the sensor and with allowance for any shielding of one object by the other, the sum of the signals that would be produced from each distinct reflecting object independently.

Demodulators D1 and D2 are arranged to produce the quadrature components of the autodyne signal resulting from reflections back into 11. That is, the magnitude of the intensity of the total reflected signal is proportional to the square root of the sum of the squares of the signals developed by D1 and D2. In a possible variation, one, rather than two, demodulators may be used with appropriate down stream modifications, obvious to one skilled in the art. Two demodulators in quadrature are used in the preferred embodiment of the invention for reasons described subsequently.

Item 11 with its included demodulators is from the prior art or, more generally, represents any device exhibiting the external characteristics just described. That is, 11 represents any device capable of transmitting phase coherent radiation of any kind and producing outputs in phase quadrature proportional to the reflected component of that radiation back into the device. Details, such as whether one, two or more antenna apertures are employed, the precise character of the radiation, and the technology and principles used to effect demodulation are immaterial and are not part of the specification or claims of this invention.

The disclosed design is based upon the assumption that the Doppler signals developed by demodulators D1 and D2 due to reflections from the door are, to a very good approximation, dependent only upon the instantaneous position of the door. This will be true when, as in the case of electromagnetic radiation, the speed of propagation of the radiation greatly exceeds the maximum speed of the door relative to 11. This assumption is relaxed in the case of reflections from pedestrians and objects other than the door. That is, the proper operation of the disclosed invention does not depend upon any particular relationship between the speed of propagation of the energy emanating from 11 and the intended objects of detection exclusive of the door.

Items 12 and 13 in FIG. 1 represent approximately matched AC-coupled amplifiers, which are required to boost the demodulated signal levels from D1 and D2 to a level suitable for subsequent processing. The bandpass characteristics of 12 and 13 should extend close to DC on the low end and as high as required to permit adequate sampling and digital representation of the waveforms at the highest speed to which the motion sensor is required to respond. Further details relating to the requisite upper bandpass limit of amplifiers 12 and 13 are given with the discussion of the CLK interrupt rate below. The lower limit should permit passing of the lowest Doppler frequency component contained within either the signal a) generated by the door when it is in motion or b) generated by the lowest state of relative motion to which the sensor is to be responsive, whichever is lower. It should be noted that DC-coupled amplifiers could be used for 12 and 13 with appropriate down stream modifications and considerations obvious to one skilled in the art.

Items 14 and 15 in FIG. 1 represent analog-to-digital (A/D) converters used to produce sample values of the amplified Doppler signals from 12 and 13 on demand for input to the microprocessor 16. A/D converters 14 and 15 should have a conversion speed sufficient to keep pace with the CLK interrupt as described below. If AC-coupled amplifiers are used for 12 and 13, standard 8-bit (256 level) converters are adequate for 14 and 15.

Item 16 in FIG. 1 represents a microprocessor and its associated memory and executable program code, described below, which may be located wholly or partly within and/or external to the microprocessor. For clarity, related components such as the CPU clock oscillator, power supply and interrupt controller chips, if required, are not shown. These will be obvious to one skilled in the art and, in any case, are fully described in the technical literature supplied with the selected microprocessor.

The microprocessor is assumed to have interrupt handling capability and a CPU clock speed sufficient to enable the microprocessor to keep pace with the demands of the sensor as will be obvious to one skilled in the art. As also described in more detail below, the microprocessor is assumed further to have basic input-output (I/O) capability for the purpose of requesting and receiving sampled Doppler signal values, for sensing two- and three-state signals characterizing the instantaneous position and sense of motion of the door and for sending the generated motion detection signal. Some of these requirements can be met in a simplified fashion using so-called flag bits available in certain common microprocessors.

Item 17 in FIG. 1 represents microprocessor interrupt signals generated externally as a function of the instantaneous position of the door (POS interrupts) as it travels in either direction over the range between fully opened and closed. Receipt of a POS interrupt causes the microprocessor to obtain instantaneous sample values from the A/D converters 14 and 15 through the mechanism of the stored program. In the calibrate phase to be described, the set of such sample values obtained over the entire range of door positions from fully opened to fully closed is stored in internal memory. Further details are given in the description of the POS interrupt signal in FIG. 2.

Item 18 in FIG. 1 represents a uniform continuous series of time-based microprocessor interrupt signals (CLK interrupts) that may be generated either externally or within the microprocessor. In a preferred embodiment, a 555 or similar timer integrated circuit (IC) configured as an oscillator with associated signal conditioning circuitry would be used as an external source of the CLK interrupt. Details are routinely provided by the manufacturer in the technical literature supplied with the timer IC and in other standard references and are, therefore, not shown here. Alternatively, the CLK interrupt could be generated using an internal timer if provided by the microprocessor selected for the application.

Yet another, but less desirable, alternative is to generate the CLK interrupt using a suitably parametrized internal programming loop.

As with the POS interrupt, receipt of a CLK interrupt causes the microprocessor to obtain instantaneous sample values from the A/D converters 14 and 15 through the mechanism of the stored program. The primary distinction between the POS and CLK interrupts, other than the details of their associated interrupt service routines to be described, is that POS interrupts, when enabled, generate samples of the Doppler signal when the door is at discrete positions throughout the range of its motion independent of its speed whereas CLK interrupts, when enabled, generate Doppler signal samples continuously at uniformly spaced intervals of time regardless of the state of motion of the door.

Item 18 in FIG. 1 shows a CLK interrupt rate of 1 kHz. This value should be understood to be for illustrative purposes only. A CLK interrupt rate appropriate for a given application should be determined on the basis of the following considerations.

The primary consideration for selecting the CLK interrupt rate is the magnitude of the greatest relative speed v to which the sensor is to be responsive. If microwaves are employed and $\lambda$ is the wavelength of the radiation emitted by 11, the demodulated Doppler frequency corresponding to speed v is $$f_D = 2v/\lambda$$

For example, an object moving at a relative speed of 6 inches/second in a 10.525 GHz (X-band) microwave radiation field produces a Doppler frequency of approximately 10.7 Hz. In a preferred embodiment in which two demodulators D1 and D2 are employed in a quadrature relationship, the amplitude and phase of the Doppler signal are contained within the samples generated by 14 and 15. Therefore, the maximum required sampling rate is determined by the Nyquist criterion. That is, the Doppler signals must be sampled at a rate at least twice the highest frequency component contained within the signals. The illustrative CLK rate of 1 kHz corresponds therefore to a maximum Doppler frequency of 500 Hz. By the above formula, 500 Hz is generated by relative motion of about 23.4 feet/second= 15.9 mph in a 10.525 GHz microwave field. Thus, the illustrative 1 kHz CLK interrupt rate would allow the sensor to detect relative motion up to 23.4 feet/second. The upper bandpass limit of amplifiers 12 and 13 in this example must likewise be at least 500 Hz or, more generally, half the CLK interrupt rate.

If only a single demodulator is employed, so that the instantaneous Doppler amplitude and phase are not available, the CLK interrupt rate must be at least twice the Nyquist criterion, which is one reason that the preferred embodiment of the invention utilizes two demodulators D1 and D2 in quadrature.

As is explained in more detail further on, a second factor determining the appropriate CLK interrupt rate is the maximum Doppler frequency contained within the signature of the door motion. In a preferred embodiment, it is necessary that the value of the door signature not change by a large percentage over an interval equal to the time between CLK interrupts. This condition is easily met in most circumstances. If not, an appropriate POS sample interpolation (on arrays RSIG1(I) and RSIG2(I)) must be included in the CLK interrupt service routine, described subsequently, in a manner that would be obvious to one skilled in the art.

CAL INT shown in FIG. 1 as a microprocessor input represents an interrupt signal used to trigger manually initiated resampling and internal storage of the door signature in arrays RSIG1(I) and RSIG2(I). It would ordinarily be tied to a switch or other manual activation device or circuit (not shown) for use in the event that recalibration is desired subsequent to the initial automatic calibration performed on power up. In a preferred embodiment, a microprocessor interrupt is utilized as illustrated. However, alternatives, such as a polled input port or flag bit, could as well be employed in a manner obvious to one skilled in the art.

Figure 2:
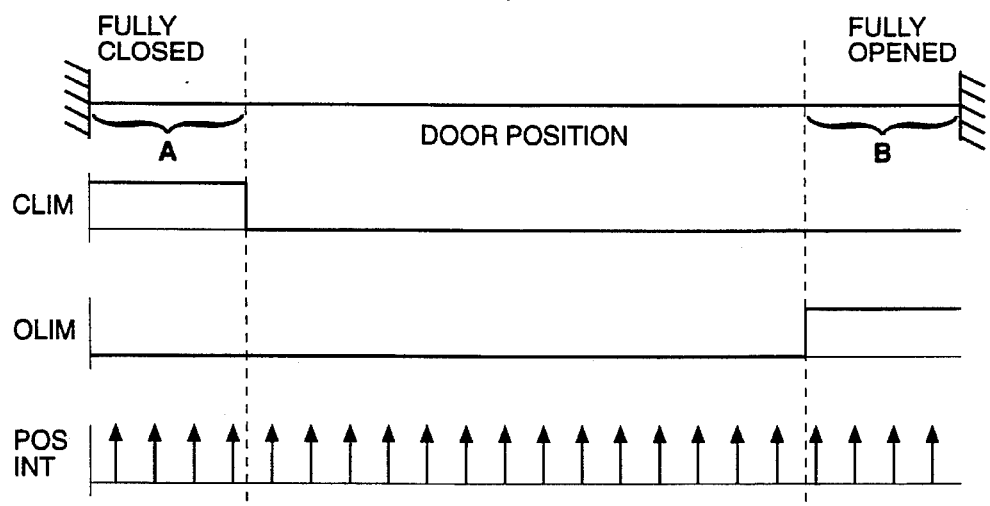
FIG. 2. is a schematic diagram illustrating the various signals applied to the microprocessor utilized by the sensor, exclusive of the Doppler signals, in relationship to the instantaneous position and motion of the controlled door.

Input signals MSENS, CLIM and OLIM characterize the position and sense of motion of the door and are described fully in the discussion of FIG. 2. The output signal labelled DETECT in FIG. 1 represents the final motion detection signal, which corresponds to the state of the internal program variable DETECT. The DETECT output signal is used, with appropriate circuitry not shown such as a relay and relay driver, to trigger the actual opening and closing of the controlled door.

THRSH and HTIM are adjustable inputs that represent the threshold for detection and the hold time to be appended to the detection signal, respectively. In a preferred embodiment of the invention, HTIM is in units of CLK interrupt intervals. For example, if the hold time is to be 1.5 seconds and the interval between successive CLK interrupts is 1 millisecond, HTIM should have the value 1500. Likewise, in a preferred embodiment of the invention, THRSH and HTIM are set with potentiometers, appropriately biased, and converted to a form suitable for input to the microprocessor using A/D converters as indicated schematically in FIG. 1. However, they may as well be set using other means, such as rotary thumb switches, DIP switches or keypad I/O. Such other means may be either a permanent part of the sensor or in whole or in part detachable from the sensor, for use only during installation setup or subsequent readjustment as required.

Content of FIG. 2

The top portion of FIG. 2 is a schematic illustration of the range of motion of the controlled door between fully opened and fully closed. While represented in linear fashion, it should be understood more generally to illustrate the range of motion of any type of door for which the concepts of fully opened and fully closed have meaning, such as sliding doors and swinging doors. The hatched areas at the ends of the upper illustration in FIG. 2 represent the absolute physical limits of the range of motion of the door. CLIM and OLIM represent electrical signals generated by the door mechanism and its associated control electronics (not shown) that signify the practical limits of the range of motion of the door. CLIM corresponds to the door fully closed, and OLIM to the door fully opened. The CLIM and OLIM signals are made available to the microprocessor as illustrated in FIG. 1. The regions marked A and B in the top portion of FIG. 2 represent the very short intervals (not drawn to scale) between the practical extremes of the motion of the door established by CLIM and OLIM and the actual physical limits of the range of motion. They are provided to allow for settling of the door motion, such as may be due to rebound, as the door approaches the fully opened and fully closed states.

POS INT in FIG. 2 represents a sequence of interrupt signals corresponding to a series of discrete door positions throughout the entire range of motion. Being for illustrative purposes only, their spacing in the figure is not necessarily to scale. Nor need they be uniformly spaced as in the illustration. Moreover, POS INT should be understood to stand generally for any signal that could be used to trigger such a series of interrupts, such as the leading or trailing edges of a series of pulses of finite width. The series of POS interrupts would typically, but not necessarily, be derived from the output of a shaft angular position encoder on the motor that drives the door and the requisite signal conditioning circuitry (not shown). An example can be found in the description of a sliding door controller contained in U.S. Pat. No. 4,563,625 to Kornbrekke et al. (1986).

The principal requirements of the POS interrupts are that a) they correspond to a series of discrete door positions throughout the entire range of motion and b) they be spaced so that the variation of either door signature signal, derived for demodulators D1 and D2 in FIG. 1, between successive POS interrupt positions is small. A precise definition of what constitutes small in this context is given subsequently. Obviously, then, the minimum acceptable set of POS interrupt positions and their spatial distribution is dependent upon the specific shape of the door signature waveform in a given application.

MSENS shown at the bottom of FIG. 2 is a signal that communicates the instantaneous sense of the door motion to the microprocessor 16 in FIG. 1. Like the CLIM, OLIM and POS INT signals, MSENS is generated by the door mechanism and its associated control electronics (not shown). Typically, the outputs of a shaft angular position encoder attached to the motor that drives the door would be processed into a signal representing the sense of the door motion. Again, an illustration can be found in the description of a sliding door controller contained in U.S. Pat. No. 4,563,625 (ibid). In a preferred embodiment, the MSENS levels designated +1, 0 and −1 represent the door opening, stopped and closing, respectively.

Other schemata that equally well represent and convey information equivalent to the CLIM, OLIM, POS INT and MSENS signals could be employed in an appropriate manner obvious to one skilled in the art. Any such variations are to be considered to fall within the scope of this invention.

FIGS. 1 and 2, just described, summarize in a schematic way the overall organization of the invention and the set of signals presented to the microprocessor 16. The specific method by which those signals are converted into a motion detection signal is contained within the microprocessor program, whose components are diagrammed in FIGS. 3, 4 and 5. In a preferred embodiment, the interrupt handling capability of the microprocessor is employed to effect the overall sensor functionality. To appreciate how this comes about, one must first be aware of the operation and content of the individual program components and then consider the manner in which the components interact in real time via the mechanism of the interrupt handling structure of the microprocessor.

Power Up and Calibration Interrupt

Figure 3:
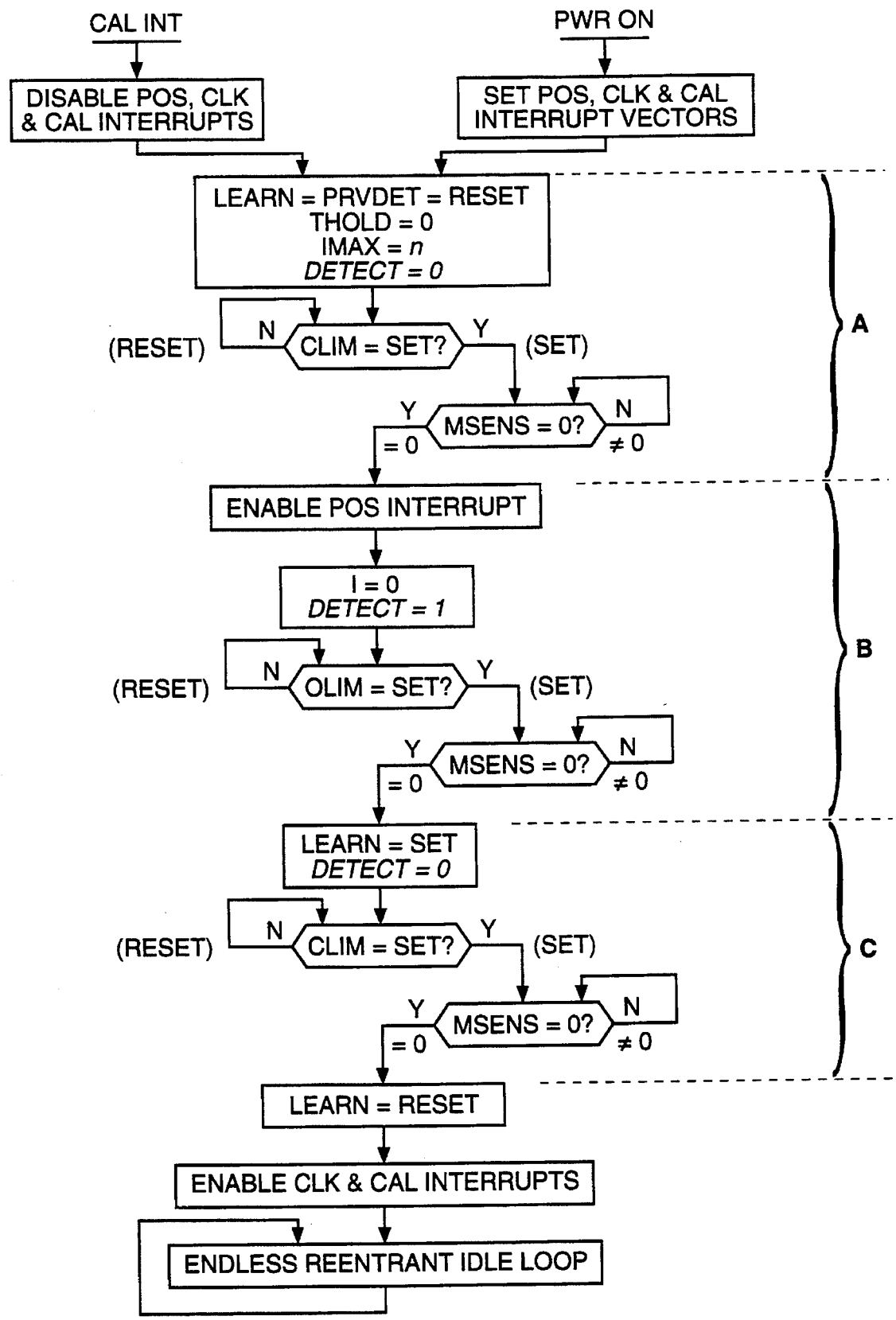
FIG. 3. is a program logic flow diagram illustrating the processing steps to be implemented by the microprocessor on power up and on manual initiation of calibration.

The principal microprocessor operations required when the sensor is powered up and when recalibration is initiated are shown in the program logic flow diagram in FIG. 3. The primary objective of this program component is to initialize properly all requisite program variables and to obtain and store in memory an image of the door signature. It is assumed that all microprocessor interrupts are disabled on power up. If the microprocessor provides an option in this respect, it must be configured so that interrupts are disabled on power up.

Processing begins at PWR ON in FIG. 3 when power is first applied. The first program step is to initialize the microprocessor interrupt transfer vector addresses corresponding to the POS, CLK and CAL interrupts so that, when enabled, program execution will be transferred to the proper interrupt service routine (ISR) on receipt of the respective interrupt. Next, flag variables LEARN and PRVDET are initialized to the RESET state. LEARN is a flag that informs the POS ISR (FIG. 4) whether or not it is to record door signature values in the arrays RSIG1(I) and RSIG2(I). PRVDET is a flag that informs the CLK ISR (FIG. 5) whether or not detection was above threshold on the previous enabled CLK interrupt. THOLD is a program variable used as a timer by the CLK ISR to append a hold time to the motion detection signal. THOLD is initialized to the value zero. The variable IMAX is set to the value n, where n is the maximum valid index into the parallel arrays RSIG1(I) and RSIG2(I). Since this is a limit that is expected to be fixed, the permanent value of IMAX may as well be stored in read-only-memory (ROM), if available, in which case the statement IMAX=n in FIG. 3 can be omitted.

DETECT is a program variable that corresponds to the motion sensor output signal DETECT used to trigger the actual opening and closing of the controlled door. The value 0 represents a command to allow the door to close. The value 1 represents a command to open the door. DETECT and, hence, the output signal DETECT incorporate the appended hold time implemented via THOLD. The internal program variable DETECT is italicized in the figures and text for two reasons. The first is to distinguish it from the motion sensor output signal DETECT with which it corresponds. The second is to emphasize a special notational convention with regard to the variable DETECT intended to simplify somewhat the program logic flow diagrams. That is, whenever and wherever the variable DETECT is set in the diagrams or described as being set in the text it is to be understood that the corresponding signal is to be sent using appropriate microprocessor instructions to the microprocessor output DETECT. Specifically, DETECT=0 indicates that the motion sensor output DETECT is to be set to the state corresponding to a command to allow the door to close. Conversely, the statement DETECT=1 indicates that the motion sensor output DETECT is to be set to the state corresponding to a command to open the door. In this way the internal variable DETECT and the output signal DETECT are maintained in strict one-to-one correspondence.

DETECT is set to 0 in section A of FIG. 3 to cause the door to close in the event that it is not already in that state. There immediately follows a wait loop on the CLIM signal, which exits when, and if, the door has closed past the CLIM limit. That is, the loop exits when the door is in region A in FIG. 2. Next follows another wait loop on the MSENS signal. This loop exits after the door has reached and stopped at the fully closed physical limit or has otherwise stopped moving in the closed state.

In section B of FIG. 3, the POS interrupt is enabled, the array index I is set to zero and the door is commanded to open via DETECT=1. The enabling of the POS interrupt means that the POS ISR (FIG. 4) will be executed on each POS interrupt generated as the door opens. There immediately follows a wait loop on the OLIM signal, which exits when, and if, the door has opened past the OLIM limit. That is, the loop exits when the door is in region B in FIG. 2. Next follows another wait loop on the MSENS signal. This loop exits after the door has reached and stopped at the fully opened physical limit or has otherwise stopped moving in the opened state.

In section C of FIG. 3, the LEARN flag is SET and the door is commanded to close via DETECT=0. POS interrupt servicing remains enabled. The setting of the LEARN flag informs the POS ISR (FIG. 4) that it is to record in the arrays RSIG1(I) and RSIG2(I) the values of the door signature at each POS interrupt position as the door closes. As in section A of FIG. 3, there immediately follows a wait loop on the CLIM signal, which exits when, and if, the door has closed past the CLIM limit. That is, the loop exits when the door is in region A in FIG. 2. Likewise, there next follows another wait loop on the MSENS signal. This loop exits after the door has reached and stopped at the fully closed physical limit or has otherwise stopped moving in the closed state.

Following section C in FIG. 3, the LEARN flag is RESET, the CLK and CAL interrupts are enabled and the processor enters an endless reentrant idle loop. POS interrupt servicing remains enabled. The processor remains in the idle loop until interrupted by receipt of the POS, CLK or CAL interrupts. Upon receipt of such an interrupt, program execution transfers automatically, via the previously set interrupt vector addresses, to the POS or CLK ISR, or, in the case of the CAL interrupt, to the CAL INT entry shown at the top of FIG. 3. The idle loop must be reentrant because, as can be seen by inspecting FIG. 3, the program flow terminates again in the idle loop subsequent to receipt of the CAL interrupt. The servicing of the CAL interrupt is identical to the power on initialization sequence already described except that the interrupt address vectors do not need to be set and the POS, CLK and CAL interrupts must be disabled. This is accomplished in the step immediately following the CAL INT entry at the top of FIG. 3. The LEARN flag is RESET in order to prevent the POS ISR from overwriting the image of the door signature already stored in arrays RSIG1(I) and RSIG2(I).

Door Position Interrupt

Figure 4:
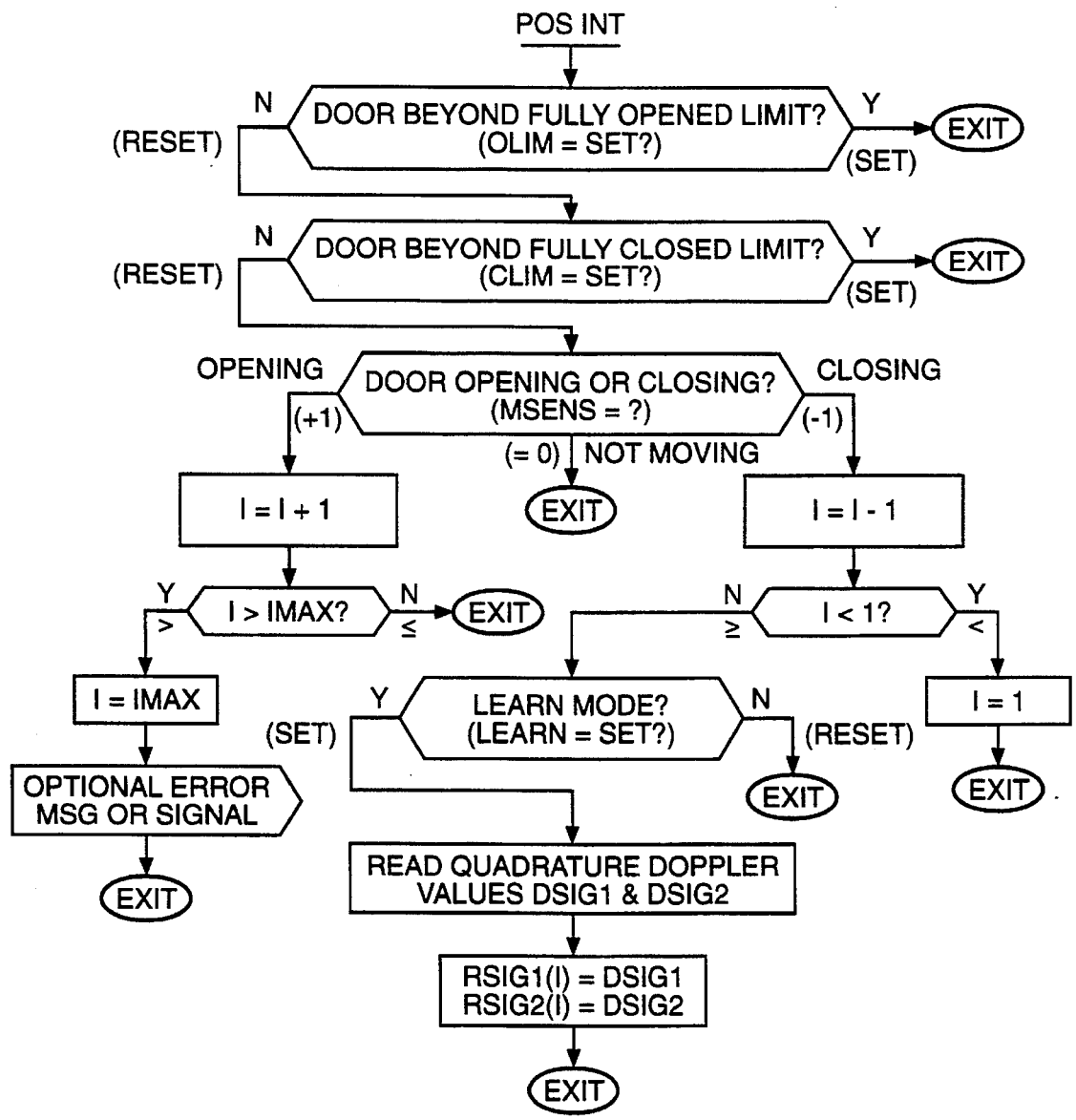
FIG. 4. is a program logic flow diagram illustrating the processing steps to be implemented by the interrupt service routine (ISR) handling the door position interrupt POS.

Program execution is transferred automatically to the POS INT entry point shown at the top of FIG. 4 on receipt of a POS interrupt, when enabled. The first two decisions in the POS ISR following the entry point cause the POS ISR to exit immediately if the door is not at that moment positioned within the active portion of its range. That is, the POS ISR terminates immediately if the door is within either the A or B region indicated in FIG. 2. In this way, the POS ISR exhibits significant functional activity only when the door position is within the active range, which excludes the terminal regions A and B.

According to the interrupt handling capabilities of the microprocessor, program execution resumes automatically at the interrupted point upon termination, or exit from, the interrupt service routine. This behavior applies to both the POS and CLK interrupt servicing, and to interrupts in general. It does not apply to the CAL interrupt because of the reentrant property of the idle loop terminating the program logic at the bottom of FIG. 3. That is, in the case of the CAL interrupt, the automatic return to the interrupted point is flushed or otherwise discarded.

If the door is within the active range, the POS ISR next tests the MSENS signal to determine in which direction the door is moving. If it is stationary (MSENS=0), the POS ISR immediately terminates. On the other hand, if the door is moving within the active range, the current value of the index I is a) incremented by one if the door is opening or b) decremented by one if the door is closing. If the index I is decremented below one when the door is closing, the index I is reset to 1 and the POS ISR immediately terminates. Conversely, if the index I is incremented beyond the value contained in the variable IMAX when the door is opening, the index I is reset to IMAX and an optional error message, signal or other code is executed to warn the user that an attempt has been made to increment I beyond IMAX. This is because IMAX represents the maximum valid entry index into the parallel arrays RSIG1(I) and RSIG2(I) in which the door signature is stored. An attempt to increment I beyond IMAX means that insufficient memory capacity has been allocated to hold the entire image of the door signature, a condition of which the user should be aware. An analogous warning is not provided if the index I is decremented below the minimum value 1 because this simply means that there is a slight inconsistency between the number of POS interrupts counted by the POS ISR as the door opens versus the number counted as it closes. Such a discrepancy is anticipated, arising typically from an inevitable small directional backlash in the mechanical components of the door.

If the index I is less than or equal to the limit IMAX after being incremented, the POS ISR immediately exits. On the other hand, if the index I is greater than or equal to 1 after being decremented, the state of the LEARN flag is tested. If LEARN is in the RESET state, the POS ISR immediately exits. Otherwise, if the LEARN flag is SET, the instantaneous values of the quadrature Doppler signal are read from the A/D converters 14 and 15 in FIG. 1 and stored in the corresponding I-th locations in the arrays RSIG1(I) and RSIG2(I). Thereafter, the POS ISR immediately exits.

To summarize the operation of the POS interrupt service routine, no action is taken if the door is not within the active range or, if it is, if the door is not moving. If the door is opening, the index I is incremented by one up to the limit IMAX. If the door is closing, the index I is decremented by one to the lower limit 1. Thus, the POS ISR maintains the index I at the value that corresponds to the current position of the door. When the door reaches the fully opened state, the index I assumes a maximum value equal to the total number of POS interrupts that fall within the active range of the door. In no case are values of the door signature read and stored when the door is opening. When the door closes, the index I is appropriately decremented to maintain its correspondence with the current door position within the active range. If the LEARN flag is SET when the door is closing, the quadrature components of the signature of the door are recorded in the arrays RSIG1(I) and RSIG2(I) using the index I. Thus, the data stored in the arrays RSIG1(I) and RSIG2(I) always represent the signature of the door in the closing phase to correspond with the fact that the stored door signature is subtracted from the raw Doppler signal (in the CLK ISR) only during the closing phase of the door. This strategy is designed to minimize possible variations due to any small directional backlash that may exist in the mechanical components of the door.

CLK Interrupt

Figure 5:
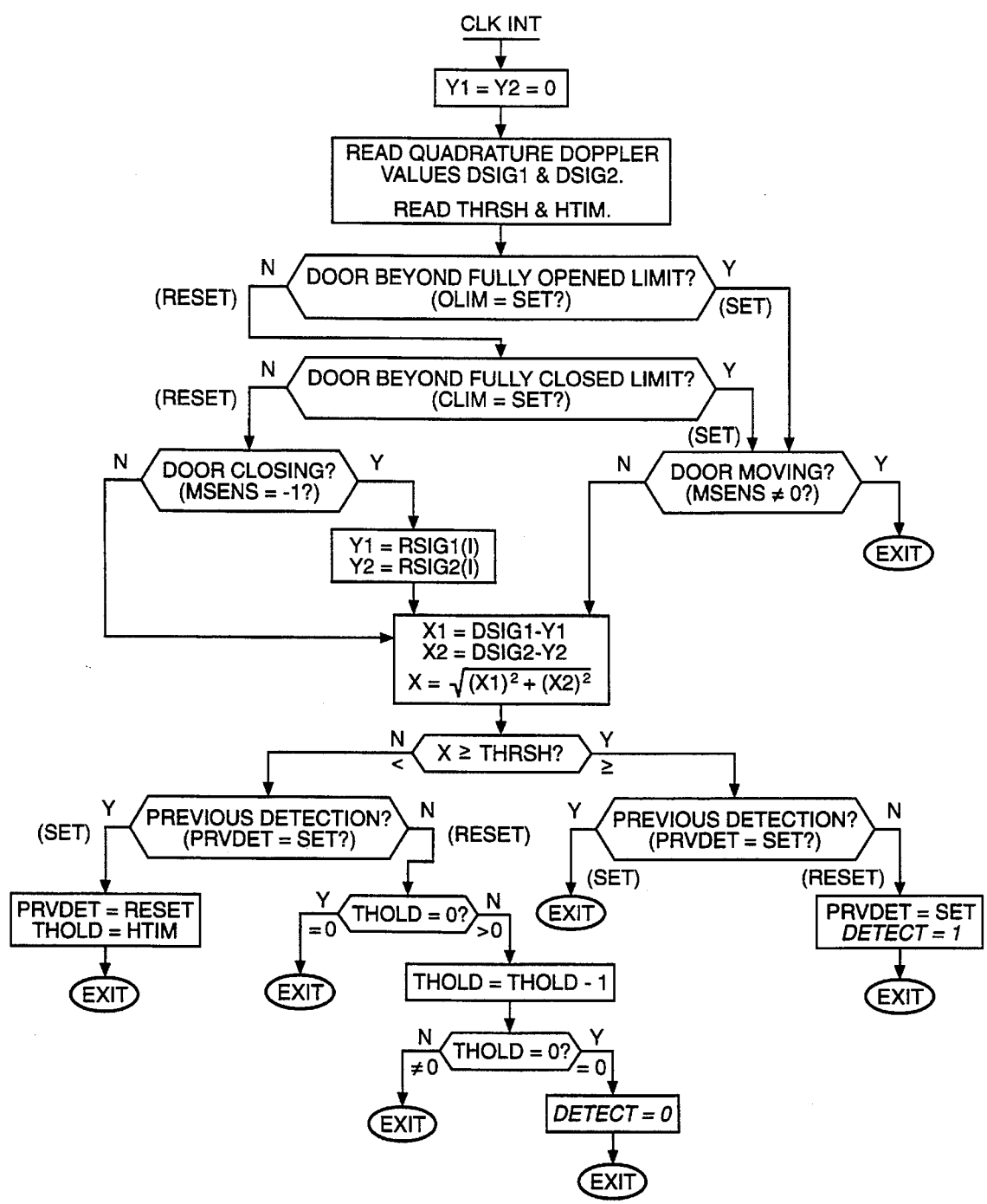
FIG. 5. is a program logic flow diagram illustrating the processing steps to be implemented by the interrupt service routine (ISR) handling the clock interrupt CLK.

Program execution is transferred automatically to the CLK INT entry point at the top of FIG. 5 on receipt of each CLK interrupt, when enabled. On entry to the CLK ISR, the temporary variables Y1 and Y2 are set to zero, the instantaneous values of the quadrature Doppler signal are read from the A/D converters 14 and 15 in FIG. 1 and stored in the temporary variables DSIG1 and DSIG2, and THRSH and HTIM are set equal to the detection threshold and hold time values currently input to the microprocessor. THRSH and HTIM are loaded on each entry into the CLK ISR in order to permit continuous adjustment by the user of the detection threshold and appended hold time as the motion sensor operates.

The two immediately following decisions in the CLK ISR cause the program execution path to branch into one of two directions depending upon the door position at the time of the CLK interrupt. If the door is not positioned within the active portion of its range, control passes to a decision as to whether the door is moving or not. Conversely, if the door is positioned within the active portion of its range, control passes to a decision as to whether the door is at that moment closing. The active portion of the door range is that portion of the door range that does not include either the A or B region indicated in FIG. 2. If the door is in either the A or B terminal region shown in FIG. 2 and it is moving (not yet settled), the CLK ISR immediately exits. Otherwise, if the door is stopped in either terminal region, control passes directly to the detection threshold logic. On the other hand, if the door is within the active region and it is closing, the two temporary variables Y1 and Y2 are reset to equal the I-th sample of the door signature stored in arrays RSIG1(I) and RSIG2(I), respectively. If the door is within the active region and is opening, or is stopped, the temporary variables Y1 and Y2 are left at the value zero set on entry to the CLK ISR. In either case, thereafter control passes to the detection threshold logic.

The detection threshold logic in the preferred embodiment shown in FIG. 5 comprises computing the magnitude X of the Doppler signal whose quadrature components have been read from the A/D converters 14 and 15 in FIG. 1 earlier in the CLK ISR after subtraction of variables Y1 and Y2 from the corresponding components. The relevant equations leading to X are shown in FIG. 5. Following the computation of X, the program execution path is again caused to branch into one of two directions depending now upon the relationship of X to the threshold THRSH. The previous detection flag PRVDET is examined in either branch. If X is at or above the threshold THRSH and PRVDET is SET, the CLK ISR immediately exits. Otherwise, if PRVDET is RESET, PRVDET is changed to the SET state, the motion sensor detection signal DETECT is set to command the door to open, and the CLK ISR exits. If X is below the threshold THRSH and PRVDET is SET, PRVDET is changed to the RESET state, THOLD is set to the value of HTIM, and the CLK ISR exits. Otherwise, if PRVDET is RESET, THOLD is tested for the value zero. If THOLD is zero, the CLK ISR immediately exits. If THOLD is not zero, THOLD is decremented by one and again tested for the value zero. If THOLD has been decremented to zero, the motion sensor detection signal DETECT is set to allow the door to close and the CLK ISR exits. Otherwise, if THOLD has not yet been decremented to zero, the CLK ISR simply exits.

To summarize the operation of the CLK interrupt service routine, no significant action is taken if the door is beyond the active range in either direction and is still moving (settling). For all other combinations of door position and sense of motion, the CLK ISR tests to see if motion is currently detectable within the sensor beam according to the threshold criterion. Whenever the door is within the active range and is closing, the signature of the door is subtracted from the raw Doppler signal quadrature values before testing against the threshold value. The object is to cancel the signature of the door if, and when, it is fully present in the raw Doppler signal data. For this reason, the POS interrupts should be sufficiently close together spatially that when the door is in motion the variation of the door signature as a function of time does not deviate significantly from the door signature sample tabulated in memory selected by the CLK interrupt service routine.

The action next to be taken depends upon whether the net signal X was, or was not, above threshold on the last enabled CLK interrupt. If the current value of the net signal is at or above threshold but the previous value was not, the door is commanded to open. Otherwise, if the previous value was also at or above threshold, no further action is taken. On the other hand, if the current value of the net signal is below threshold but the previous value was not, the counter THOLD used to meter out the appended detection hold time is set to its maximum value HTIM. Otherwise, if the previous value was also below threshold, the hold time is decremented through successive calls to the CLK ISR for as long as both values are below threshold until the expiration of the appended hold time. At that point, the door is commanded to close unless there has in the interim been a change of the relationship of X to the detection threshold.

Other criteria could be substituted for the detection algorithm within the CLK ISR. In particular, if only one demodulator is employed in 11 in FIG. 1, a different detection algorithm must be adopted because, without the full quadrature information, the net Doppler signal will be oscillatory, even for a single moving target. The approach typically used in conventional autodyne motion sensors employing only one demodulator amounts to counting cycles of this oscillatory behavior that go above threshold. Detection is based upon a certain number of cycles going above threshold within a prescribed interval of time. A disadvantage of this approach is that several cycles must pass before detection is triggered, introducing an undesirable motion detection delay. If the detection criteria are adjusted to cause triggering on, say, only one cycle above threshold in order to reduce the detection delay, the motion sensor may trigger falsely on random transients. This tendency is reduced when the full quadrature information is utilized because of the redundancy provided by the two quadrature channels. That is, if the signals in both quadrature channels go above threshold sequentially within a half a cycle, a genuine moving target is almost certainly within the sensor beam. For this reason, among others, dual demodulators are specified in a preferred embodiment of this invention.

Asynchronous Interrupt Operation

The overall operation of the disclosed sensor, taking into account the asynchronous interaction of the program components via the interrupt handling structure of the microprocessor, is as follows.

On power up, the door is automatically commanded through one open-close sequence. Samples of the quadrature components of the door signature are stored in memory on each POS interrupt during the closing phase of this initial sequence. The door signature in memory can be updated at any time thereafter using the CAL calibration interrupt. Upon completion of initialization or calibration, the microprocessor enters an endless reentrant idle loop. Thereafter, independent of the state of motion of the door, the magnitude of the reflected signal level is monitored continuously on each CLK interrupt by combining the quadrature components from the dual demodulators D1 and D2 in FIG. 1. If and when the magnitude of the reflected signal level exceeds the currently set threshold THRSH, the DETECT signal is sent to command the door to open. When the magnitude of the reflected signal level subsequently falls below threshold, the DETECT signal is altered to command the door to close on expiration of an additional adjustable appended hold time specified by HTIM.

Whenever the door is in motion in either direction within the active range, the POS interrupt service routine updates the index I to correspond to the current position of the door. The correct value of the index I, maintained by the POS ISR, is available asynchronously to the CLK ISR when it executes.

In the special case that the door is closing through the active range subsequent to initialization or calibration, the quadrature components of the stored door signature are subtracted from the corresponding components of the raw Doppler signal prior to the computation of the signal magnitude used for comparison with the detection threshold in the CLK interrupt service routine. The index I maintained independently by the POS ISR, which reflects the current position of the closing door, is used by the CLK ISR to select the proper sample values from the tabulated door signature in memory. In this way, the sensor is rendered insensitive to the motion of the closing door to the extent that the door is unobstructed from the perspective of the sensor. Consequently, the door is allowed to close if no object or person is in the line of sight between the sensor and the door. On the other hand, if there is an object or person in relative motion anywhere within the motion sensor beam as the door closes, the resultant Doppler signal from that object or person will remain after subtraction of the door signature and will, if of sufficient amplitude, trigger motion detection. Furthermore, to the extent that the object or person obscures the door from the perspective of the motion sensor, whether in relative motion or not, the net Doppler signal after subtraction will be over compensated for the door signature. This causes the sensor to acquire characteristics of a presence sensor as an object or person approaches the door.

In a preferred embodiment of the invention, the door signature is recorded during an initial door cycle at power up. It can also be recorded on manual initiation at any time. Many variations of this procedure obvious to one skilled in the art are anticipated. For example, the door signature could be recorded two, or more, times through several door cycles at power up and compared. If there are significant variations between the recordings, initialization could be considered unacceptable because of the likelihood of objects or persons moving in the vicinity of the door, whereupon a warning could be flashed to clear the door area to permit proper initialization. In yet another variation, the amplitude range of the net signal after subtraction of the door signature could be examined each time the door closes. If no objects or pedestrians are present in the vicinity of the door, this range would be expected to fall below some limited value. Whenever this was the case, the small residual differences could be considered as corrections to the currently tabulated image of the door signature, which could be applied in a variety of ways. In this way, the sensor would adapt to slow variations of the door signature over time. These, and other such variations, will be obvious to one skilled in the art and are to be considered to fall within the scope of this invention.

I claim:

1. An autodyne motion sensor apparatus comprising:
   a) a source of phase coherent radiation,
   b) means for producing autodyne demodulation signals from reflections of said phase coherent radiation,
   c) a microprocessor,
   d) a stored program executed by said microprocessor comprising a motion detection algorithm, e) means for entering said autodyne demodulation signals into said microprocessor, f) means for entering control signals into said microprocessor, g) means for entering into said microprocessor values parametrizing said detection algorithm, h) means for transmitting a detection signal from said microprocessor, i) means for recording said autodyne demodulation signals characteristic of a specific object within the field of said source as a function of position, j) means for subtracting said recorded autodyne demodulation signals from said autodyne demodulation signals entered into said microprocessor prior to processing by said detection algorithm, whereby said autodyne motion sensor can be made selectively insensitive to said object within the field of said source and whereby said autodyne motion sensor tends to acquire presence detection properties as said source is shielded.

2. The autodyne motion sensor apparatus of claim 1, wherein a) said means for producing said autodyne demodulation signals contains two demodulators yielding a pair of components of said autodyne demodulation signals in phase quadrature, b) said detection algorithm is based on a combination of the members of said pair of signal components in phase quadrature.

3. The autodyne motion sensor apparatus of claim 2, wherein said object within the field of said source is an automatic door controlled by said sensor.

4. The autodyne motion sensor apparatus of claim 1, wherein a) said means for producing said autodyne demodulation signals contains a single demodulator yielding a single component of said autodyne demodulation signals, b) said detection algorithm is based on said single component of said autodyne demodulation signals, 5. The autodyne motion sensor apparatus of claim 4, wherein said object within the field of said source is an automatic door controlled by said sensor.

6. A method for sensing motion comprising:

a) a source of phase coherent radiation, b) means for producing autodyne demodulation signals from reflections of said phase coherent radiation, c) a microprocessor, d) a stored program executed by said microprocessor comprising a motion detection algorithm, e) means for entering said autodyne demodulation signals into said microprocessor, f) means for entering control signals into said microprocessor, g) means for entering into said microprocessor values parametrizing said detection algorithm, h) means for transmitting a detection signal from said microprocessor, i) means for recording said autodyne demodulation signals characteristic of a specific object within the field of said source as a function of position, j) means for subtracting said recorded autodyne demodulation signals from said autodyne demodulation signals entered into said microprocessor prior to processing by said detection algorithm, whereby said method can be made selectively insensitive to said object within the field of said source and whereby said method tends to acquire presence detection properties as said source is shielded.

7. The method for sensing motion of claim 6, wherein a) said means for producing said autodyne demodulation signals contains two demodulators yielding a pair of components of said autodyne demodulation signals in phase quadrature, b) said detection algorithm is based on a combination of the members of said pair of signal components in phase quadrature.

8. The method for sensing motion of claim 7, wherein said object within the field of said source is an automatic door controlled by said method.

9. The method for sensing motion of claim 6, wherein a) said means for producing said autodyne demodulation signals contains a single demodulator yielding a single component of said autodyne demodulation signals, b) said detection algorithm is based on said single component of said autodyne demodulation signals, 10. The method for sensing motion of claim 9, wherein said object within the field of said source is an automatic door controlled by said method.

* * * * *